(12) United States Patent
Baker et al.

(10) Patent No.: US 6,814,564 B2
(45) Date of Patent: Nov. 9, 2004

(54) MOLD WITH FLUID DRIVEN FORM KEYS

(75) Inventors: Philip Stanley Baker, Fairport, NY (US); Kenneth James Simmons, Stanley, NY (US); John Gardner Fuller, Canandaigua, NY (US)

(73) Assignee: Pactiv Corporation, Lake Forest, IL (US)

( * ) Notice: Subject to any disclaimer, the term of this patent is extended or adjusted under 35 U.S.C. 154(b) by 344 days.

(21) Appl. No.: 09/854,998

(22) Filed: May 14, 2001

(65) Prior Publication Data

US 2001/0030384 A1 Oct. 18, 2001

Related U.S. Application Data

(60) Continuation-in-part of application No. 09/794,450, filed on Feb. 27, 2001, now abandoned, which is a division of application No. 09/385,487, filed on Aug. 30, 1999, now Pat. No. 6,261,504.

(51) Int. Cl.[7] .............................................. B29C 51/34
(52) U.S. Cl. ....................... 425/394; 425/150; 425/398; 425/412; 425/441; 425/DIG. 58
(58) Field of Search ................. 425/394, 398, 425/441, 150, 412, DIG. 58

(56) References Cited

U.S. PATENT DOCUMENTS

| | | | |
|---|---|---|---|
| 3,126,582 A | 3/1964 | Scott | 425/388 |
| 3,183,291 A | 5/1965 | Miller et al. | 264/322 |
| 3,284,553 A | 11/1966 | Edwards | 264/522 |
| 3,293,697 A | 12/1966 | Balint | 425/441 |
| 3,337,664 A | 8/1967 | Lyon | 264/547 |
| 3,530,537 A | 9/1970 | Walker | 425/310 |
| 3,551,954 A | 1/1971 | Knowles | 425/398 |
| 3,703,255 A | 11/1972 | Wade | 229/220 |
| 3,879,159 A * | 4/1975 | Smith | 425/388 |
| 3,967,991 A | 7/1976 | Shimano et al. | 264/321 |
| 3,986,809 A * | 10/1976 | Haag | 425/388 |

(List continued on next page.)

OTHER PUBLICATIONS

PCT Search Report for International Application No. PCT/US00/21953, dated Dec. 29, 2000.

*Primary Examiner*—Allan R. Kuhns
(74) *Attorney, Agent, or Firm*—Jenkens & Gilchrist

(57) ABSTRACT

A pair of form keys and a method for forming reverse drafts in foam parts are disclosed. A male form key is reciprocally mounted in a first mold half in a retracted position. A female form key is rotatably mounted in a second mold half in a neutral position. The first mold half includes a first drive pin that when engaged, moves the male form key into engagement with a foam sheet to form an undercut as the first and second mold halves are closed. The first mold half also includes a second drive pin that engages the female form key as the first and second mold halves close rotating the female form key into engagement with the foam sheet and the male form key. After closure of the mold and the product is formed, the mold is opened. As this occurs, the drive pins are disengaged and the male form key retracts and the female form key rotates to their neutral positions. The formed product may then be stripped from the mold while maintaining the reverse draft or undercut. In a further embodiment the male form key and the female form key are fluid actuated.

9 Claims, 7 Drawing Sheets

U.S. PATENT DOCUMENTS

| | | | |
|---|---|---|---|
| 3,988,191 A | 10/1976 | Matsui | 264/321 |
| 3,995,763 A | 12/1976 | Ayers et al. | 220/74 |
| 4,060,577 A | 11/1977 | Collins | 264/321 |
| 4,073,609 A | 2/1978 | Petrenchik | 425/442 |
| 4,108,347 A | 8/1978 | Amberg | 264/321 |
| 4,113,824 A | 9/1978 | Matsui et al. | 264/321 |
| 4,121,402 A | 10/1978 | Cress et al. | 264/321 |
| 4,127,378 A | 11/1978 | Meadors | 425/398 |
| 4,281,979 A | 8/1981 | Doherty et al. | 264/321 |
| 4,286,766 A | 9/1981 | von Holdt | 249/144 |
| 4,359,160 A | 11/1982 | Myers et al. | 264/321 |
| 4,383,819 A | 5/1983 | Letica | 425/577 |
| 4,386,044 A | 5/1983 | Arndt et al. | 264/321 |
| 4,442,064 A | 4/1984 | Myers et al. | 264/321 |
| 4,446,088 A | 5/1984 | Daines | 264/155 |
| 4,502,660 A | 3/1985 | Lether et al. | 249/144 |
| 4,534,927 A | 8/1985 | Morioka et al. | 264/321 |
| 4,609,339 A | 9/1986 | Padovani | 425/383 |
| 4,627,810 A | 12/1986 | Von Holdt | 425/577 |
| 4,690,666 A | 9/1987 | Alexander | 425/394 |
| 4,822,553 A | 4/1989 | Marshall | 264/292 |
| 4,878,970 A | 11/1989 | Schubert et al. | 264/321 |
| 5,015,169 A | 5/1991 | Inzinna et al. | 425/394 |
| 5,118,277 A | 6/1992 | Padovani | 425/398 |
| 5,368,469 A | 11/1994 | Ekkert | 425/441 |
| 5,637,332 A | 6/1997 | Ridout | 425/398 |
| 6,010,062 A | 1/2000 | Shimono | 264/321 |
| 6,261,504 B1 * | 7/2001 | Baker et al. | 264/318 |

* cited by examiner

MOLD WITH FLUID DRIVEN FORM KEYS

RELATED APPLICATIONS

This application is a continuation-in-part of U.S. patent application Ser. No. 09/794,450 filed Feb. 27, 2001, now abandoned, which is a divisional of U.S. patent application Ser. No. 09/385,487 filed Aug. 30, 1999, U.S. Pat. No. 6,261,504, and entitled *"Form Keys And Method For Thermoforming Undercuts In Foam Parts."*

FIELD OF THE INVENTION

The present invention relates generally to form keys and a method for using form keys for thermoforming undercuts in matched molded foam parts. More particularly, the invention relates to form keys for forming a reverse draft in thermoformed parts, and to a method for thermoforming undercuts in parts using matched metal molds and for stripping the part from the molds while maintaining the undercuts.

BACKGROUND OF THE INVENTION

Foam containers for restaurants, schools, hospitals and the like are typically formed by placing a foam sheet between a pair of molds and closing the molds to thermoform a part. If the part requires, for example, a lock for a hinged lid container, a reverse draft or undercut can be formed, but forming a reverse draft or undercut for a lock in the part, particularly foam parts, has been a problem. A reverse draft has been difficult to form in foam containers such as polystyrene foam containers due to an inability to strip the formed part from the tooling while maintaining the desired shape of the reverse draft. For this reason, a continuous thermoforming process for forming parts, with a reverse draft has not been possible. If this problem could be overcome, this would allow for different closure designs in parts, and the development of continuous thermoforming processes for forming foam parts.

SUMMARY OF THE INVENTION

The present invention is directed to form keys for forming a reverse draft in a thermoformed part, for example, a polystyrene foam part such as a hinged lid container, and to a method for thermoforming a reverse draft or undercut in the part and stripping the part from a mold while maintaining the shape of a reverse draft or undercut. The form key is part of a mold used to thermoform foam parts. The mold includes two halves, a first half with a forming cavity and a second half with a forming plug. A male form key is reciprocally mounted in the first mold half and reciprocates into and out of the forming cavity in response to engagement with a first drive pin which is reciprocally mounted in the first mold half and moved by engagement with the second mold half. A female form key is rotatably mounted in the second mold half and is rotated between a first and a second position upon engagement with a second drive pin mounted on the first mold half.

The method of thermoforming foam parts includes placing a foam sheet between a forming cavity mold and a forming plug mold each including the male form key or the female form key as described above. Prior to thermoforming, the male form key is biased to a retracted position out of a cavity and the female form key is biased to a non-engaging position. The forming cavity mold and forming plug mold are then brought together. As this occurs, the male form key and female mold key are moved into the foam sheet forming an undercut or reverse draft in a part formed from the foam sheet. The forming cavity mold and forming plug mold are then moved apart. As this occurs, the male form key and female form key are moved away from the formed part and the formed part can be stripped from the forming cavity and plug molds while maintaining the undercut.

In another embodiment, the male and female form keys are attached to pistons that are fluid driven. Fluid flow to and from the pistons is controlled by valves actuated by a signal indicating opening or closing of the molds.

Although the present invention is disclosed for matched metal molds and thermoforming foam parts, the invention is applicable to non-matched metal molds and forming parts from solid sheets.

BRIEF DESCRIPTION OF THE DRAWINGS

Other objects and advantages of the invention will become apparent upon reading the following detailed descriptions and upon reference to the drawings in which.

DETAILED DESCRIPTION OF THE ILLUSTRATED EMBODIMENT

Figure 1:
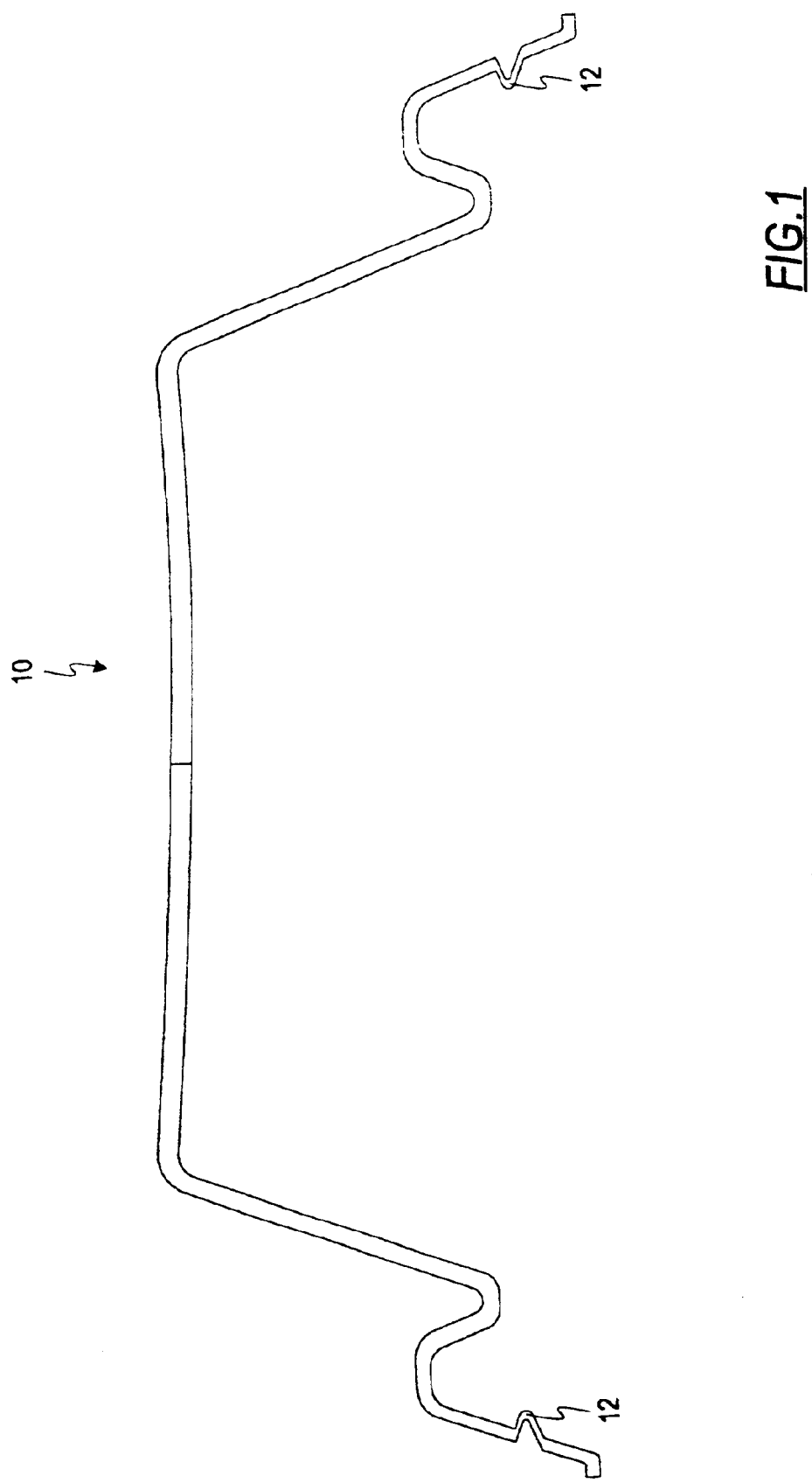
FIG. 1 is an enlarged cross sectional view of a thermoformed part including a reverse draft or undercut formed in accordance with the principles of the present invention.

Referring now to the drawings, a thermoformed part 10 with a reverse draft or undercut 12 formed in accordance with the principles of the present invention is illustrated in FIG. 1. The part 10 is of a foam material such as polystyrene foam formed using matched metal tooling. It should be recognized, however, that the principles of the present invention are also applicable to sheet material and non-matched metal tooling. In the embodiment illustrated, the part 10 is a lid or cover for a foam container that can be used by restaurants, schools, hospitals, hotels, food distributors, and the like for containing items such as food. The reverse draft or undercut 12 of this embodiment serves as part of a locking structure to lock the part or cover 10 to another part, such as a tray, of a container. The ability to form the reverse draft or undercut 12 in foam products allows for different closure or locking designs and leak resistant foam containers.

In the past, thermoforming a reverse draft or undercut with matched metal tooling has had the problem of an inability to strip a formed part, such as part 10, from the matched tooling while maintaining the shape of the reverse draft or undercut 12. The matched tooling or mold 14 shown in FIGS. 2–4 overcomes this problem. The mold 14 includes a first mold half 16 defined by a forming cavity 18 that is attached to a top platen 20. The forming cavity 18 defines a cavity 19.

The mold 14 also includes a second mold half 22 defined by a forming plug 24 attached to a bottom platen 26. The forming plug 24 defines a plug 27 of a complimentary configuration to the cavity 19. The undercut 12 is formed by male form keys 28 reciprocally mounted in the forming cavity 18 and female form keys 30 rotatably mounted in the forming plug 24. The male form keys 28 are located in a slot 32 in the forming cavity 18 and are biased by biasing elements such as springs 34 to a retracted position out of the cavity 19. A force to move the form keys 28 to a position extending into the cavity 19 is provided by first drive pins 36 each reciprocally mounted in the forming cavity 18 and biased to a first position (shown in FIGS. 2 and 4) by a biasing element such as a spring 38. The first drive pins 36 include a cut out 40 and an inclined ramp 42. In the neutral position of the first drive pins 36 (FIGS. 2 and 4), the male form keys 28 are in the slot 40 above the ramp 42. In this neutral position the male form keys 28 are retracted out of the cavity 19 under the biasing force of the springs 34. The forming cavity 18 further includes second drive pins 44 that interact with the female form keys 30.

Figure 2:
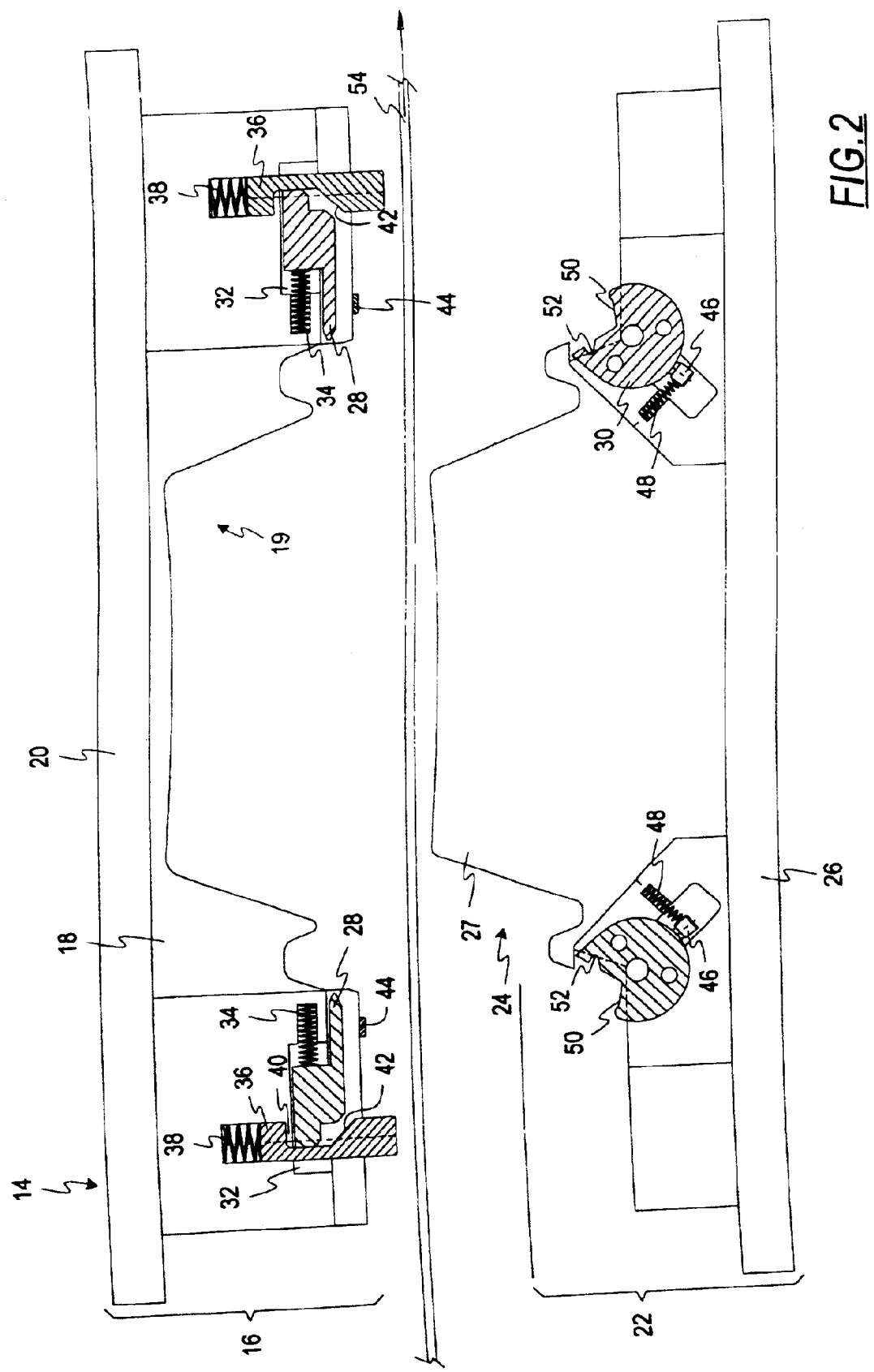
FIG. 2 is a cross sectional view of a mold in an open position and used to mold the formed part illustrated in FIG. 1.
Figure 4:
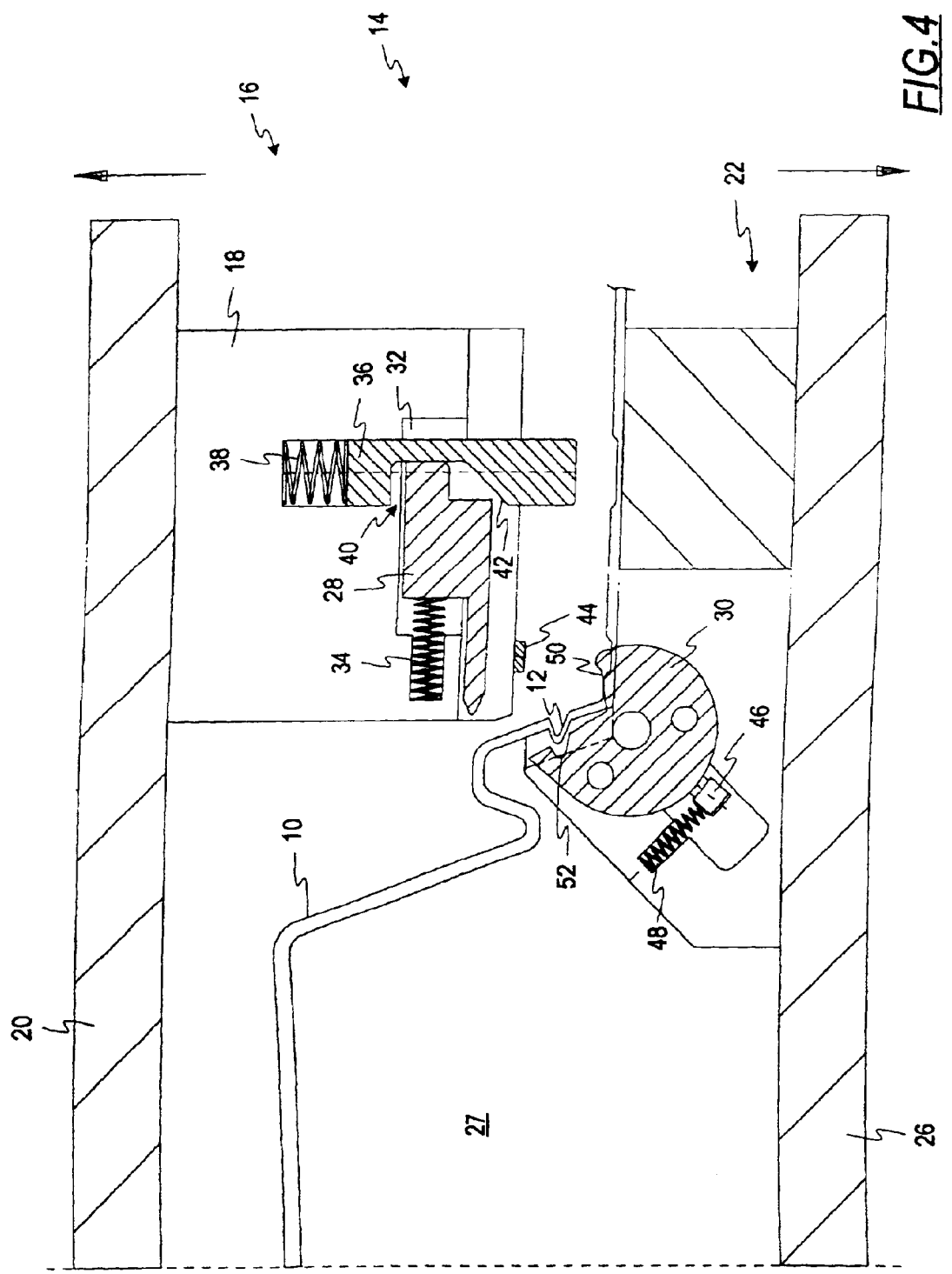
FIG. 4 is a view similar to FIG. 3 with the mold in the open position after the foam part has been thermoformed with a reverse draft or undercut.

The female form keys 30 each includes a stem 46 to which a biasing member such as a spring 48 is attached. The springs 48 bias each female form key 30 to a first, neutral position (FIGS. 2 and 4). Each female form key 30 also includes a pin engagement surface 50 and an undercut surface 52.

Figure 3:
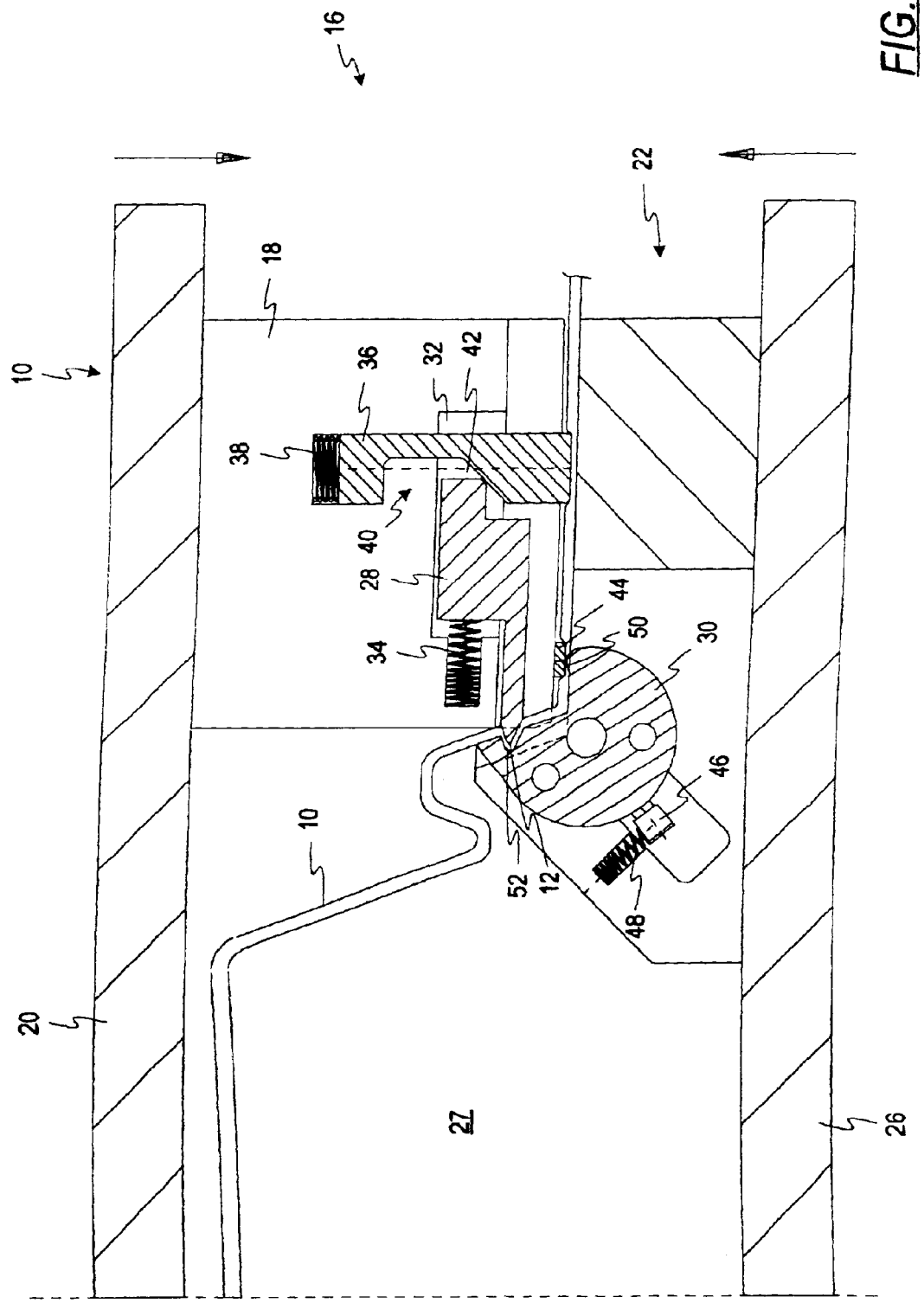
FIG. 3 is an enlarged cross sectional view of a portion of the mold in the closed position showing the male and female form keys in positions engaging the foam part and forming a reverse draft or undercut.

To thermoform a foam part 10, a sheet of foam material 54 is positioned between the first mold half 16 and the second mold half 22 while the mold 14 is in the open position (FIG. 2). The thermoforming process is commenced by bringing the first mold half 16 and the second mold half 22 together (FIG. 3). As this occurs, the first drive pins 36 engage the second mold half 22 moving the first drive pins 36 upwardly causing the inclined ramp 42 to engage the male form keys 28. This engagement moves the male form keys 28 into the forming cavities 18 and into the sheet of foam material 54. At the same time, the second drive pins 44 engage the sheet of foam material 54 and the pin engagement surfaces 50 on the female form keys 30. This engagement rotates the female form keys 30 into engagement with the sheet of foam material 54 and the male form key 28 forming the reverse draft or undercut 12 upon closure of the mold 14.

Once the foam part 10 and the reverse draft or undercut 12 have been formed, the mold 14 is opened (FIG. 4). As this occurs, the drive pins 36 and 44 are moved out of engagement with the second mold half 22 and return to their neutral positions (FIG. 4). The male form keys 28 and the female keys 30 also return to their neutral positions out of engagement with the formed part 10 allowing sufficient clearance for the formed part 10 to be stripped from the mold 14 without interference while maintaining the shape of the reverse draft or undercut 12.

What has been described are mechanically driven form keys 28 and 30 that allow for undercuts 12 to be thermoformed into foam parts 10 using matched metal molds 14. This structure allows the foam part 10 to be stripped from the mold 14 without damage to the undercut 12 or having the part 10 hang up in the mold 14 thus allowing for a continuous thermoforming process. This allows the design of different closure designs in foam parts. As previously noted, the present invention may also be used in a thermoforming process using non-matched metal molds.

Figure 5:
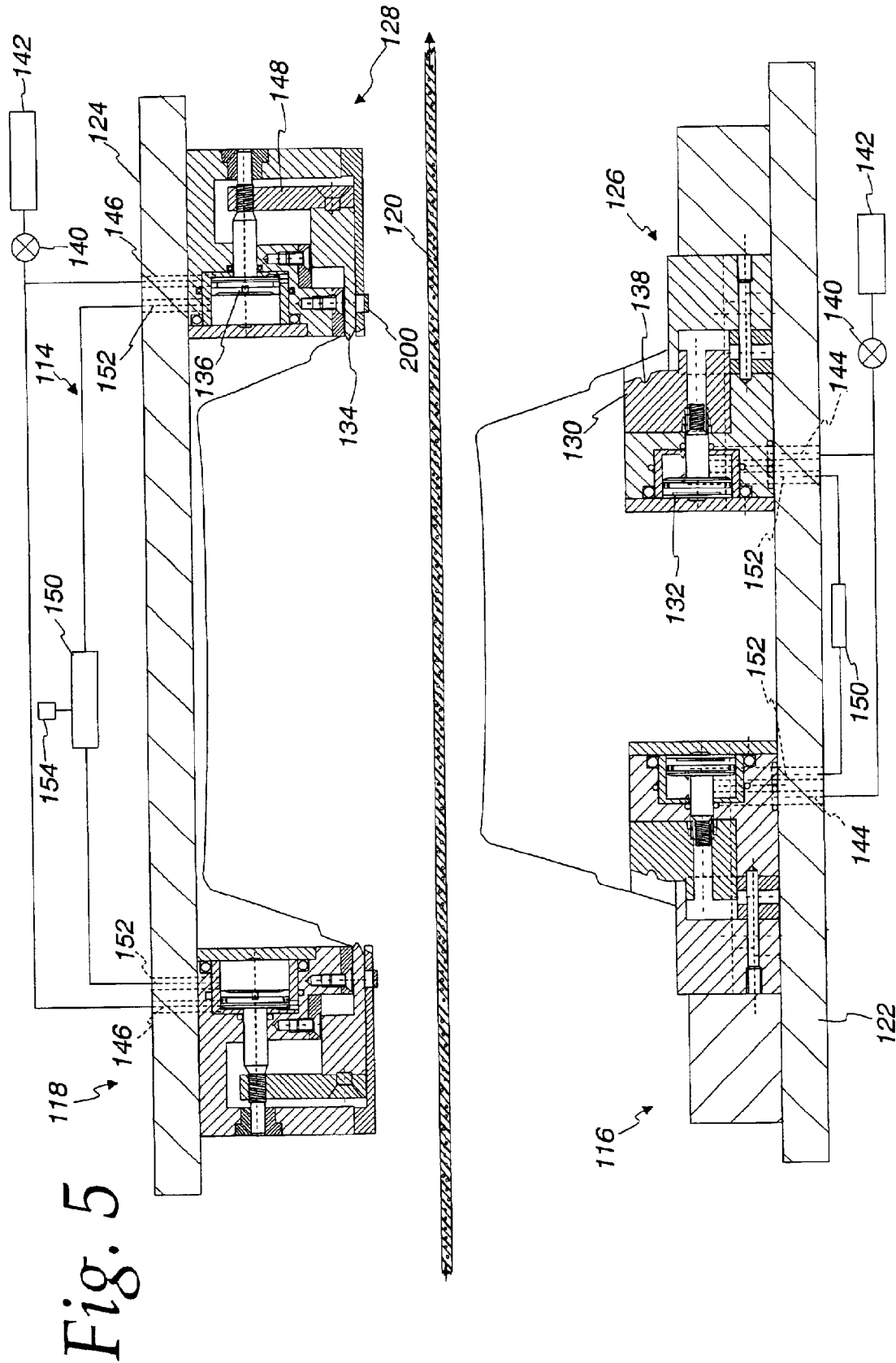
FIG. 5 is a cross sectional view of another embodiment of a mold in an open position.
Figure 6:
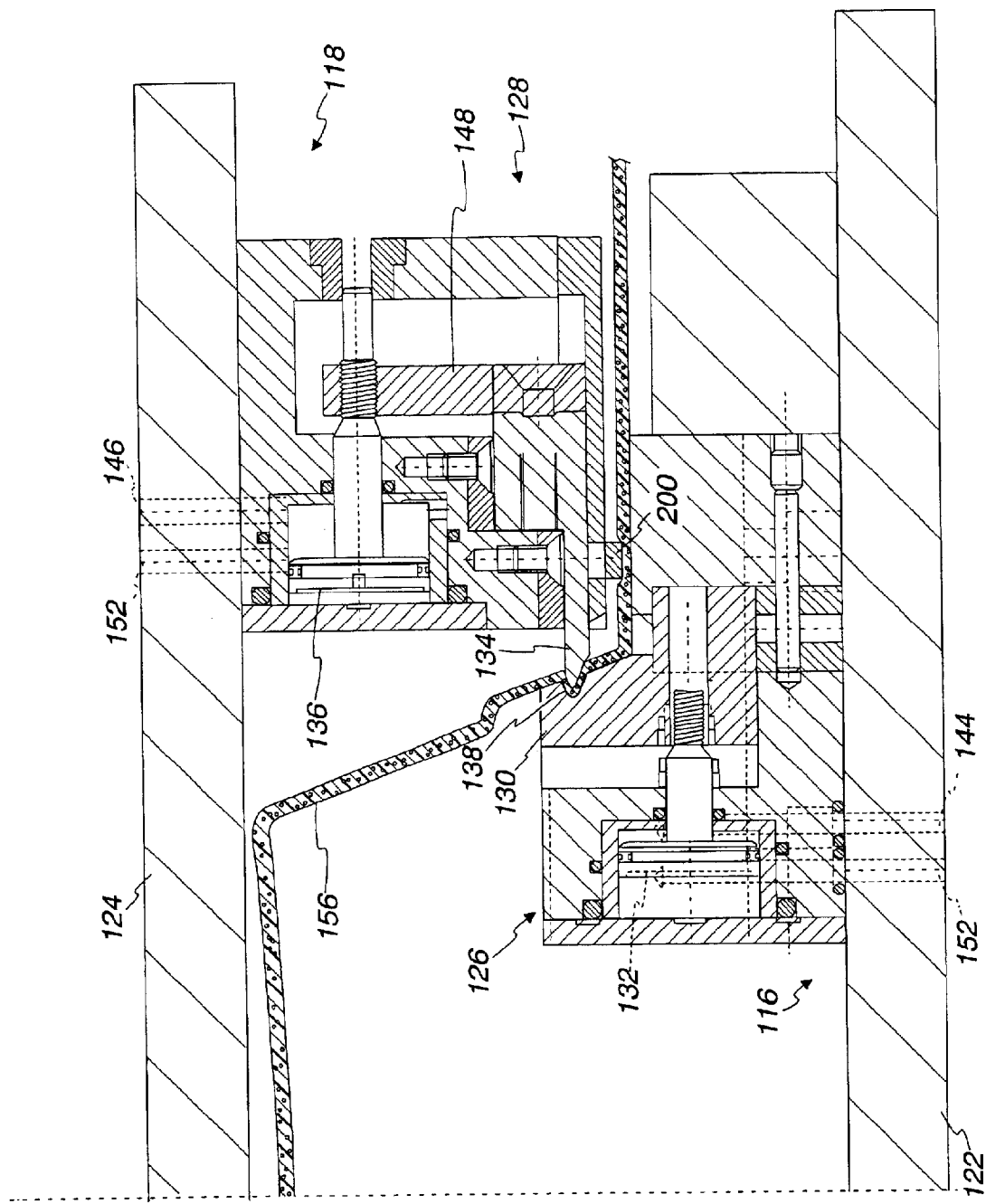
FIG. 6 is an enlarged cross sectional view of a portion of the mold illustrated in FIG. 5 showing the male and female form keys in positions engaging a foam part and forming a reverse draft or undercut.
Figure 7:
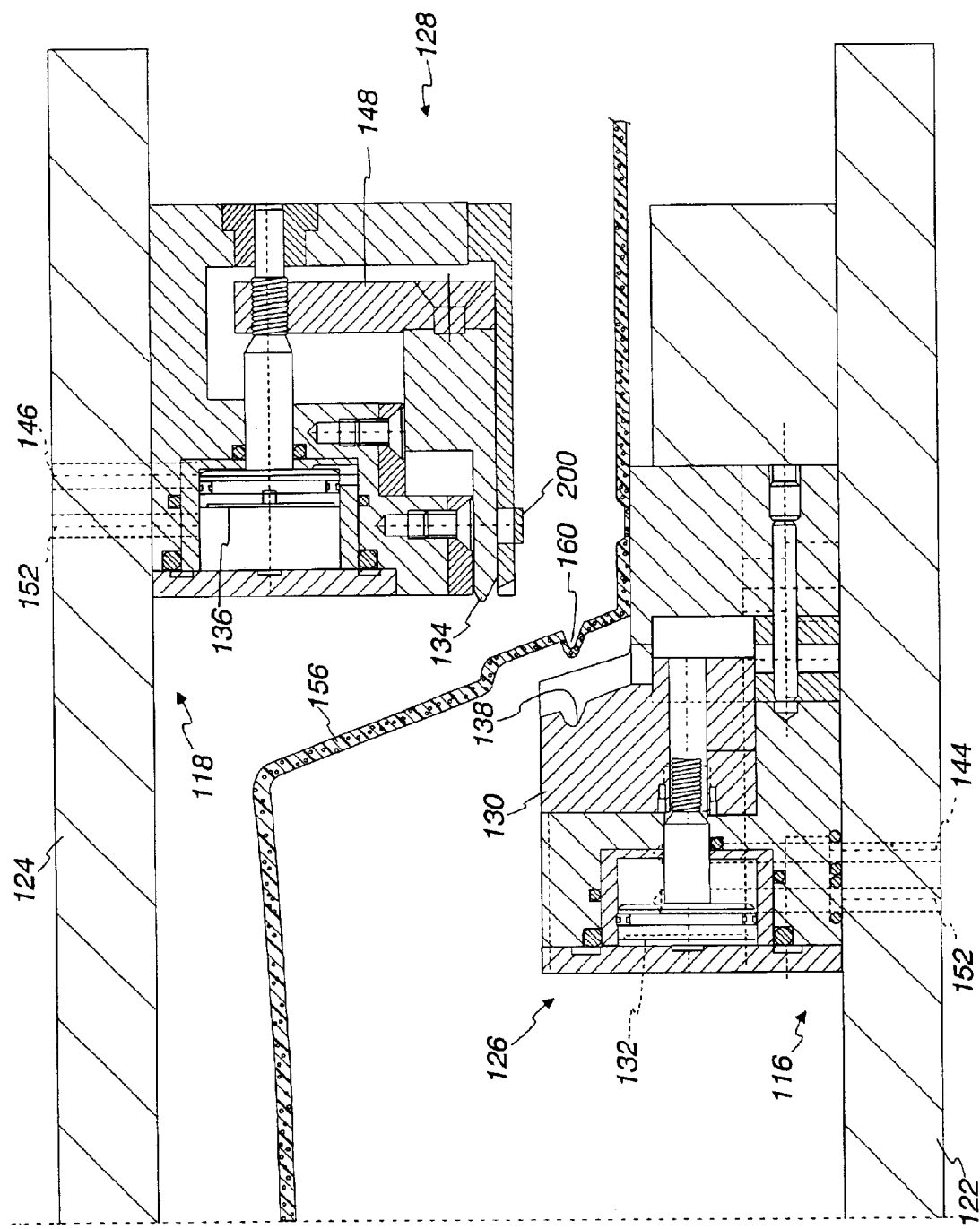
FIG. 7 is a view similar to FIG. 6 with the mold in the open position after the foam part has been thermoformed with a reverse draft or undercut.

Another embodiment of the invention is illustrated in FIGS. 5–7. Referring initially to FIG. 5, a matched tooling or mold 114 in the open position. The mold 114 includes a male plug 116 and a female cavity 118. A foam sheet 120 that is to be thermoformed is located between the male plug 116 and the female cavity 118. The male plug 116 is secured to a lower mounting plate 122 and the female cavity 118 is secured to an upper mounting plate 124. As the upper mounting plate 124 and the lower mounting plate 122 are brought together, the foam sheet 120 is thermoformed into a shape conforming to the male plug 116 and the female cavity 118.

In order to form a reverse draft or undercut in the product formed by thermoforming the foam sheet 120, a female form key assembly 126 is mounted in the male plug 116 and a male form key assembly 128 is mounted in the female cavity 118. The female form key assembly 126 includes a female form key 130 that is attached to a first fluid driven piston 132. The male form key assembly 128 includes a male form key 134 that is attached to a second fluid driven piston 136 by a connecting member 148. When the mold 114 is closed (FIG. 6), the male form key 134 and the female form key 130 are actuated moving the male form key 134 into an undercut surface 138 in the female form key 130.

The thermoforming process begins by closing the mold 114 on the foam sheet 120. Once this occurs, a signal is sent to a valve 140, such as a solenoid valve, opening the valve 140. Opening the valve 140 allows fluid which may be pneumatic or hydraulic held under pressure in a tank 142 to enter channels 144 and 146 moving the first fluid driven piston 132 and the second fluid driven piston 136 forward. At the same time fluid on the other side of the first fluid driven piston 132 escapes through channel 152 to a reservoir 150 and fluid on the other side of the second fluid driven piston 136 escapes through channel 152 to the reservoir 150. As the first fluid driven piston 132 and the second fluid driven piston 136 each move forward, the female form key 130 and the male form key 134 move toward each other with the male form key 134 entering the undercut surface 138 forming a reverse draft 160 (FIG. 7) in the thermoformed part 156.

At the completion of the formation of the reverse draft or undercut 160 in the thermoformed part 156, the fluid flow into reservoir 150 is reversed in response to a signal from a timer 154 retracting the first fluid driven piston 132 and the second fluid driven piston 136 and the mold 114 is opened (FIG. 7). As can be seen in FIG. 7, as the mold 114 starts to open, the female form key 130 and the male form key have been retracted allowing clearance for the formed part 156 to be stripped from the mold 114 without any interference.

The fluid drive form keys 130, 134 are interchangeable with the mechanically driven form keys 28, 30 through the use of a female drive pin 200. The female drive pin 200 corresponds to the second drive pins 44 (FIGS. 2–4). By replacing the female fluid drive form key assembly 126 with the female form keys 30 and their related structure, the female drive pin 200 will actuate the female form keys 30 in a manner similar to the second drive pins 44.

While the present invention has been described with reference to the particular embodiments illustrated, those skilled in the art will recognize that many changes and variations may be made thereto without departing from the spirit and scope of the present invention. The embodiments and obvious variations thereof are contemplated as falling within the spirit and scope of the claimed invention, which is set forth in the following claims:

What is claimed is:

1. A mold with form keys for forming a reverse draft in a thermoformed part, comprising:

a matched mold, said mold including a male plug, said male plug including a female form key and a first fluid driven actuator for actuating said female form key, said mold including a female cavity, said female cavity including a male form key and a second fluid driven actuator for actuating said male form key, wherein the mold is adapted to form a thermoformed foam part.

2. The mold claimed in claim 1 further comprising a first source of fluid in communication with said first fluid driven actuator for actuating said female form key toward said male form key, said first source of fluid in communication with said second fluid driven actuator for actuating said male form key toward said female form key.

3. The mold claimed in claim 1 further comprising a timer for retracting said first and second fluid driven actuators upon a predetermined period of time after actuation of said first and second fluid driven actuators.

4. The mold claimed in claim 1 wherein said first and second fluid driven actuators are pneumatic.

5. The mold claimed in claim 1 wherein said first and second fluid driven actuators are hydraulic.

6. A matched mold for thermoforming undercuts into foam parts, comprising:

a male plug, said male plug includes a female form key moveably mounted thereon, and a first fluid actuated piston connected to said female form key for moving said female form key relative to said male plug, and a female cavity, said female cavity includes a male form key moveably mounted thereon, and a second fluid actuated piston connected to said male form key for moving said male form key relative to said female cavity and toward said female form key, wherein the mold is adapted to be used with a thermoformed foam part and wherein the male plug and the female cavity form a matched mold.

7. The mold claimed in claim 6 further comprising a source of pressurized fluid in communication with said first and second fluid actuated pistons, and a valve and a timer for controlling communication between said source and said first and second fluid actuated pistons.

8. A mold with form keys for forming a reverse draft in a thermoformed foam part, comprising:

a first mold half including a female cavity, a male form key moveably mounted therein and moveable between a first position extending into said cavity and a second position retracted out of said cavity, a first fluid driven piston adapted to be moved from a first position to a second position, said first fluid driven piston movable to said second position so as to allow said male form key to move to its second position so as to assist in forming the reverse draft in the thermoformed part; and a second mold half including a male plug, a female form key moveably mounted therein and moveable between a first position and a second position, a second fluid driven piston adapted to be moved from a first position to a second position, said second fluid driven piston movable to said second position so as to allow said female form key to move to its second position so as to assist in forming the reverse draft in the thermoformed part.

9. The mold of claim 8, wherein said male form key includes a portion in a configuration corresponding to the configuration of said reverse draft to be formed, and said female form key includes a portion complementary to said portion of said male form key.

* * * * *